Jan. 8, 1952 A. J. BERGERON 2,582,095
INDIVIDUAL POULTRY ROOST
Filed July 28, 1949 2 SHEETS—SHEET 1
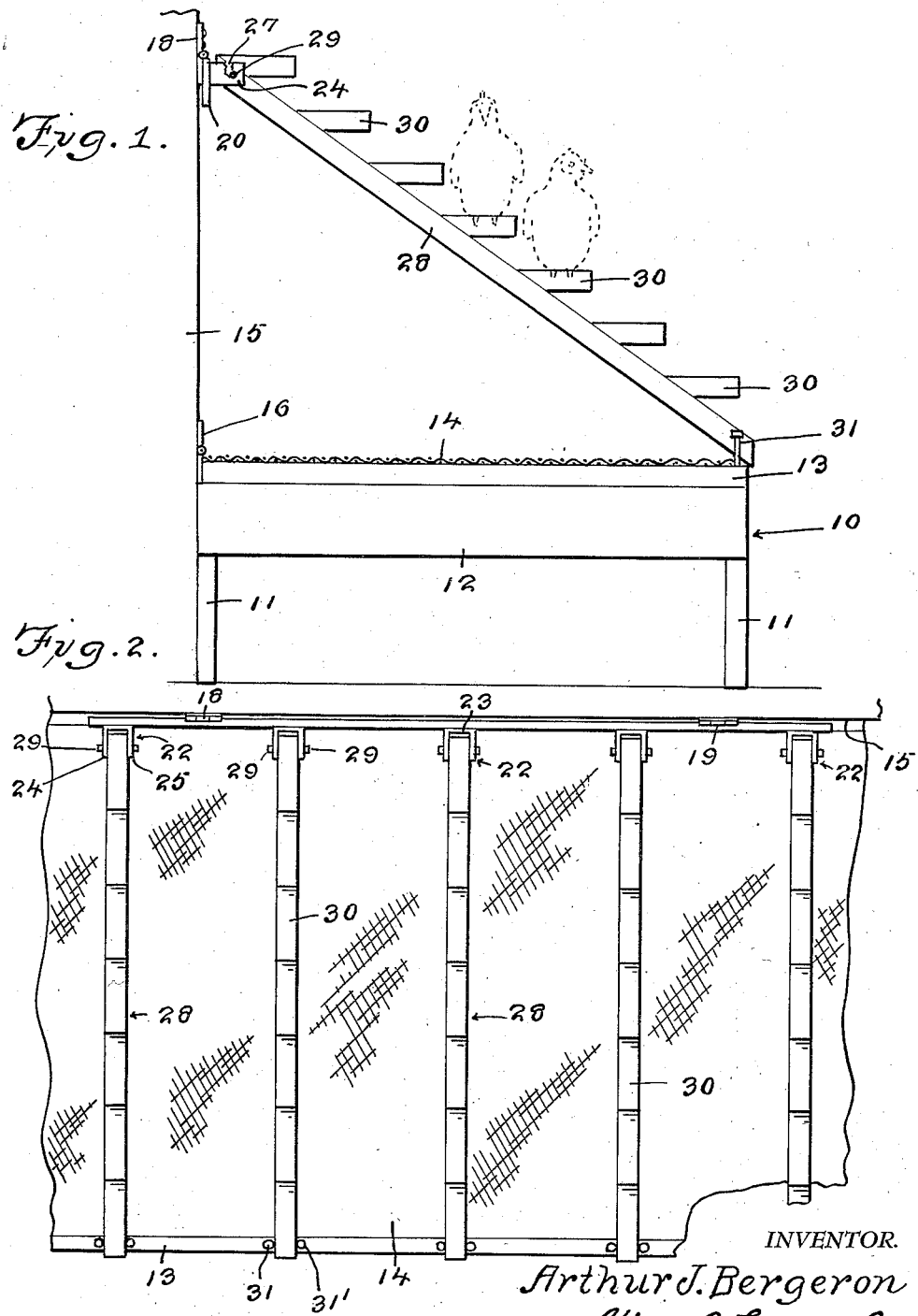
INVENTOR.
Arthur J. Bergeron
BY Victor J. Evans & Co.
ATTORNEYS

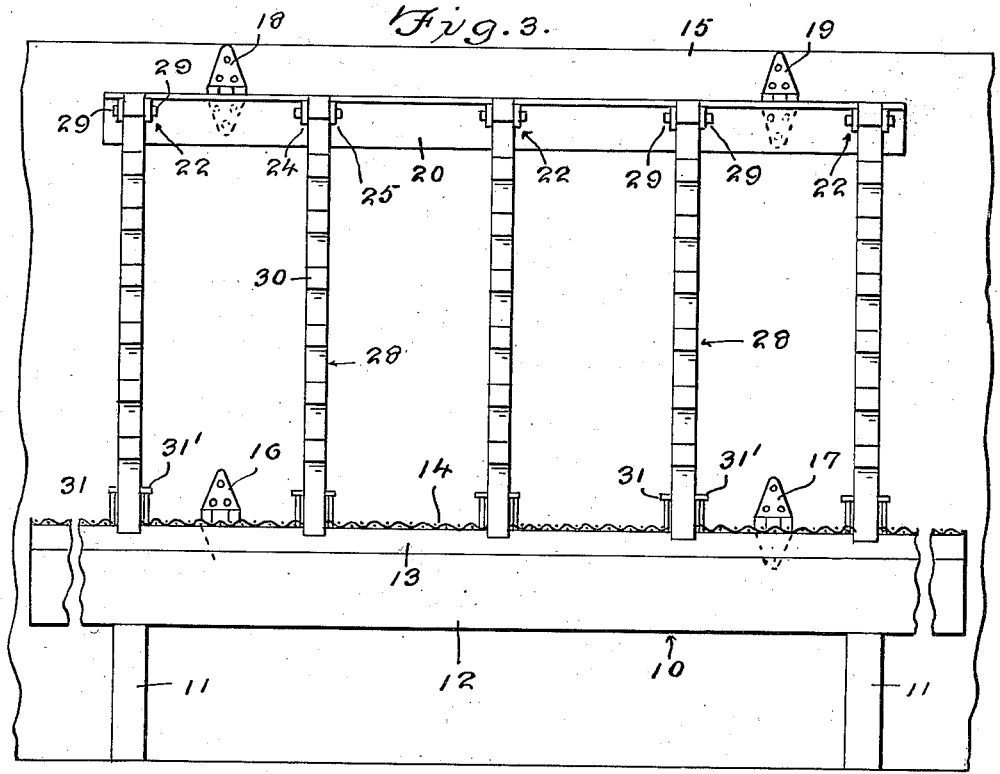
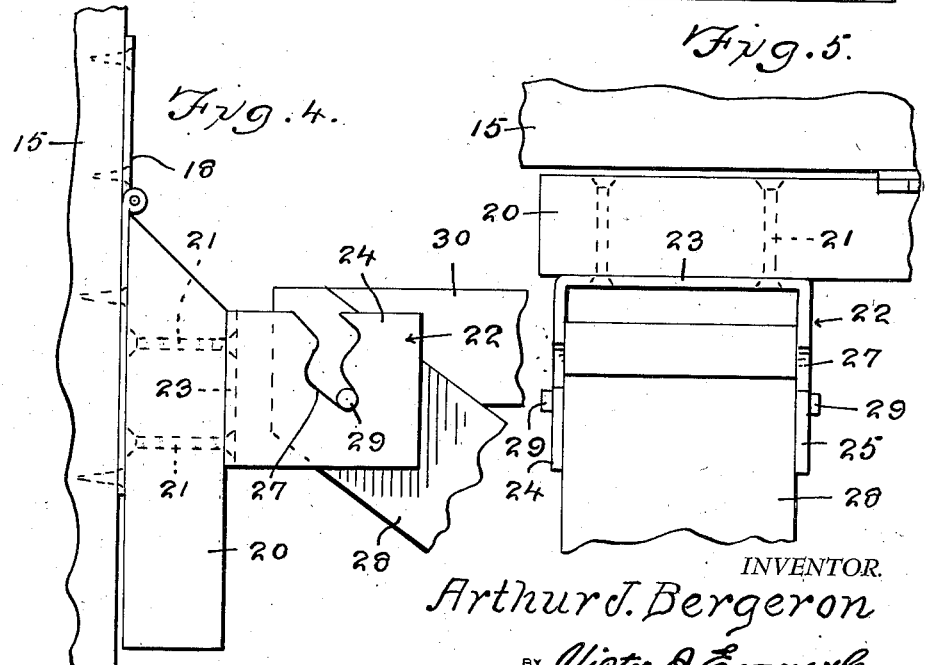

Patented Jan. 8, 1952

2,582,095

UNITED STATES PATENT OFFICE 2,582,095

INDIVIDUAL POULTRY ROOST

Arthur J. Bergeron, Kittery, Maine

Application July 28, 1949, Serial No. 107,233

4 Claims. (Cl. 119—24)

This invention relates to poultry houses, and more particularly to a poultry roost.

The object of the invention is to provide a poultry roost which includes a plurality of spaced roost bars for supporting individual birds thereon, so that the birds, while roosting, will not be crowded together.

Another object of the invention is to provide a plurality of bars for supporting individual birds or fowl thereon, the bars being spaced from each other whereby the birds will not be crowded together so that colds, respiratory diseases and the like in the birds will be minimized.

Still another object of the invention is to provide a poultry roost which is constructed so that fresh air can freely circulate therebetween, the roost being easily disassembled for facilitating the cleaning thereof.

A further object of the invention is to provide a poultry roost which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the poultry roost, according to the present invention;

Figure 2 is a top plan view of the poultry roost;

Figure 3 is a front elevational view of the poultry roost;

Figure 4 is an enlarged fragmentary side elevational view, showing the connection of the body members to the back board and poultry house wall; and Figure 5 is a top plan view of the assembly of Figure 4.

Referring in detail to the drawings, the numeral 10 designates a table or platform which includes supporting legs 11, and a horizontally disposed top 12. Supported on the platform 10 is a frame member 13 which has secured thereto a screen or reticulated member 14, the screen 14 defining a dropping pit for the poultry or fowl, such as chickens.

The platform 10 is adapted to be positioned in a poultry house, the vertically disposed back wall of the poultry house being designated by the numeral 15. Hinges 16 and 17 hingedly connect the frame member 13 to the wall 15 of the poultry house so that the screen 14 and frame 13 can be pivoted or raised when it is desired to clean the surface therebeneath.

A pair of hinges 18 and 19 hingedly connect a horizontally disposed back board 20 to the wall 15. Arranged in spaced parallel relation along the board 20 and secured thereto by suitable securing elements, such as rivets 21, is a plurality of U-shaped hanger members 22. Each of the hanger members 22 includes a web 23 which is arranged contiguous to the board 20 and projecting from the web 23 is a pair of spaced legs 24 and 25. Each of the legs 24 and 25 is provided with a tapered slot 27, the slot 27 in the leg 24 being arranged in opposed aligned relation with respect to the slot 27 in the other leg 25. Carried by each of the inclined body members 28 is a pin 29 and the ends of the pins 29 seat in the slots 27 whereby a detachable connection is provided between the body members 28 and the hanger members 22.

Projecting from each of the body members 28 and secured thereto, is a plurality of horizontally disposed outwardly extending cantilevered roost bars 30 which serve to support individual fowl thereon. For preventing shifting movement of the body members 28 laterally, a pair of suitable securing elements, such as headed nails 31 and 31' embrace the lower ends of each of the body members, the nails being driven into the frame member 13.

From the foregoing, it is apparent that a poultry roost has been provided which includes the plurality of horizontally disposed outwardly extending cantilevered roost bars 30 that are adapted to each support thereon a single fowl, such as a chicken. The body members 28 which support the roost bars 30 can be raised or detached when it is necessary to clean the dropping pit therebelow. The roost bars 30 are equally spaced from each other so that the birds will not crowd together when roosting, the bars 30 being long enough to support only one bird thereon. By preventing the fowl from crowding during roosting, overheating of the birds will be eliminated and such things as colds and respiratory diseases in the fowl will be minimized. There will be no fighting between the birds over roosting space, and the spaced arrangement of the roost bars 30 allows a free circulation of air therebetween. In actual use, the birds which first enter on the poultry roost will go to the uppermost of the bars 30 while subsequent birds will occupy the succeeding bars 30 therebelow. Further, the counting of the fowl is greatly simplified by using the poultry roost of the present invention. It is to be understood that the poultry roost of the present invention can be used either with or without the dropping pit. Also, the construction of this poultry roost enables a person to readily move the parts to an out of the way position to permit cleaning thereof. The hangers 22 provide a combination support and hinge connection for the body members 28.

What I claim:

1. In a poultry house, the combination with a horizontally disposed supporting platform, and a vertically disposed back wall, of a poultry roost operatively connected to said platform and wall, said poultry roost comprising a horizontally disposed back board hingedly connected to said wall, a plurality of hanger members secured to said back board, a plurality of downwardly inclined body members having their upper ends detachably connected to said hanger member and their lower ends supported on said platform, and a plurality of horizontally disposed, spaced, parallel cantilevered roost bars projecting outwardly from each of said body members and secured thereto.

2. The apparatus as described in claim 1 and further including a pair of securing elements arranged in embracing relation with respect to the lower end of each of said body members and projecting into said platform for preventing shifting movement of said body members.

3. In a poultry house, the combination with a horizontally disposed platform, and a vertically disposed wall, a screened frame supported on said platform and pivotally connected to said wall, said screened frame defining a dropping pit, of a poultry roost operatively connected to said wall and platform, said poultry roost comprising a back board arranged above said platform and hingedly connected to said wall, a plurality of U-shaped hanger members secured to said back board, a plurality of downwardly inclined body members having their upper ends detachably connected to said hanger member and their lower ends supported on said platform, and each of said body members having a plurality of horizontally disposed, spaced, parallel, cantilevered roost bars projecting outwardly from said body members and secured thereto.

4. The apparatus as described in claim 3 and further including a pair of securing elements arranged in embracing relation with respect to the lower end of each of said body members and serving to prevent lateral shifting of the latter.

ARTHUR J. BERGERON.

REFERENCES CITED

The following references are of record in the file of this patent:

UNITED STATES PATENTS

| Number | Name | Date |
|---|---|---|
| 742,699 | Mattox | Oct. 27, 1903 |
| 800,642 | Gustus | Oct. 3, 1905 |
| 902,393 | Frantz | Oct. 27, 1908 |